(12) United States Patent
Terada et al.

(10) Patent No.: US 11,167,794 B2
(45) Date of Patent: Nov. 9, 2021

(54) SUPPORT STRUCTURE FOR VEHICLE AND METHOD OF MANUFACTURING THE SAME

(71) Applicant: NISSIN KOGYO CO., LTD., Tomi (JP)

(72) Inventors: Kazuhiro Terada, Tomi (JP); Yasuhiro Maruyama, Tomi (JP)

(73) Assignee: NISSIN KOGYO CO., LTD., Nagano (JP)

( * ) Notice: Subject to any disclaimer, the term of this patent is extended or adjusted under 35 U.S.C. 154(b) by 218 days.

(21) Appl. No.: 16/418,315

(22) Filed: May 21, 2019

(65) Prior Publication Data

US 2019/0367089 A1 Dec. 5, 2019

(30) Foreign Application Priority Data

May 29, 2018 (JP) .............................. JP2018-102165

(51) Int. Cl.
*B62D 7/18* (2006.01)

(52) U.S. Cl.
CPC ............ *B62D 7/18* (2013.01); *B60G 2206/50* (2013.01)

(58) Field of Classification Search
CPC .............................. B62D 1/18; B60G 2206/50
See application file for complete search history.

(56) References Cited

U.S. PATENT DOCUMENTS

| 9,643,647 | B2* | 5/2017 | Conner | B60G 7/001 |
| 2013/0181480 | A1 | 7/2013 | Yamamoto | |
| 2016/0090121 | A1* | 3/2016 | Conner | B62D 7/18 |
| | | | | 280/93.512 |
| 2020/0238759 | A1* | 7/2020 | Kajikawa | B22D 25/02 |
| 2020/0307689 | A1* | 10/2020 | Maruyama | B22C 9/082 |

FOREIGN PATENT DOCUMENTS

| JP | 2001114127 | 4/2001 |
| JP | 2001170750 | 6/2001 |
| JP | 2013144488 | 7/2013 |

OTHER PUBLICATIONS

Japanese Office Action dated Aug. 25, 2020 for JP application No. 2018102165, 5 pages.

* cited by examiner

*Primary Examiner* — James A English
(74) *Attorney, Agent, or Firm* — Andrew M. Calderon; Roberts Calderon Safran & Cole, P.C.

(57) ABSTRACT

A support structure for a vehicle molded by a casting mold, provided between a vehicle body and a vehicle component, and including a support portion which supports the vehicle component and a rib which is continuously formed on the support portion. The support structure for a vehicle includes a core portion recessed in a direction different from a mold split direction of the casting mold on a side surface portion of the rib.

10 Claims, 3 Drawing Sheets

SUPPORT STRUCTURE FOR VEHICLE AND METHOD OF MANUFACTURING THE SAME

CROSS-REFERENCE TO RELATED APPLICATION

This application claims priority from Japanese Patent Application No. 2018-102165, filed on May 29, 2018, the entire subject matter of which is incorporated herein by reference.

TECHNICAL FIELD

The present invention relates to a support structure for a vehicle and a method of manufacturing the same.

BACKGROUND

As shown in Patent Document 1 (JP-A-2013-144488) or the like, a steering knuckle (support structure for a vehicle) which transmits transmission force from steering to wheels has a complicated and irregular shape which comprising a main body including a cylindrical fitting hole into which an axle (bearing) is fitted and fixed, and a support portion connected to a periphery of the main body via a rib and connecting and supporting a vehicle component on a vehicle body side, such as an upper suspension, a lower suspension, and a steering arm.

As described above, in many cases, the steering knuckle is formed with ribs when connecting a plurality of support portions for supporting the vehicle components. Since such a steering knuckle is formed by a mold split casting method, it is necessary to set a draft angle which is thinner toward the tip end side (in the mold split direction) on the rib in order to remove the rib by mold split. In other words, the base portion side of the rib has to be thick, and there is an unnecessary thickness on the strength of the rib, which hinders weight reduction.

SUMMARY

The present invention has been made to solve the above problems, an object of the present invention is to provide a support structure for a vehicle which can achieve weight reduction and a method of manufacturing the same.

The support structure for the vehicle according to the present embodiment is molded by a casting mold and is provided between a vehicle body and a vehicle component. The support structure for the vehicle includes a support portion for supporting the vehicle component and a rib continuously formed on the support portion. The support structure for the vehicle includes a core portion recessed in a direction different from the mold split direction of the casting mold on a side surface portion of the rib.

A peripheral edge portion of the core portion can be formed into an inclined wall surface expanding from a bottom surface of the core portion to an outer surface of the rib.

The inclined wall surface can be formed into a rounded surface smoothly continuous with the bottom surface and the outer surface of the rib.

The thickness from the bottom surface of the core portion to the inner surface of the rib can be equal to the thickness from the inner surface to the outer surface of the tip end portion of the rib.

A method of manufacturing a support structure for a vehicle provided between a vehicle body and a vehicle component and includes a support portion which supports the vehicle component and a rib continuously formed on the support portion, includes casting the support structure by a casting mold. The casting includes forming a core portion recessed in a direction different from a mold split direction on a side surface portion of the rib by punching with a punching mold that slides in a direction different from the mold split direction of the casting mold.

According to the first aspect of the present invention, since there is no unnecessary portion on the side surface of the rib due to the restriction of the draft angle, the weight of the support structure for the vehicle can be reduced.

According to the second aspect of the present invention, it is possible to facilitate the removal of the punching mold for forming the core portion.

According to the third aspect of the present invention, since the core portion can be formed into a smooth shape, the appearance can be made inconspicuous.

According to the fourth aspect of the present invention, the required strength can be provided without applying unnecessary thickness to the entire rib.

According to the fifth aspect of the present invention, the unnecessary portion on the side surface of the rib due to the restriction of the draft angle can be easily punched, and the weight of the vehicle support structure can be reduced.

DETAILED DESCRIPTION

Hereinafter, embodiments of the present invention will be described in detail.

Figure 1:
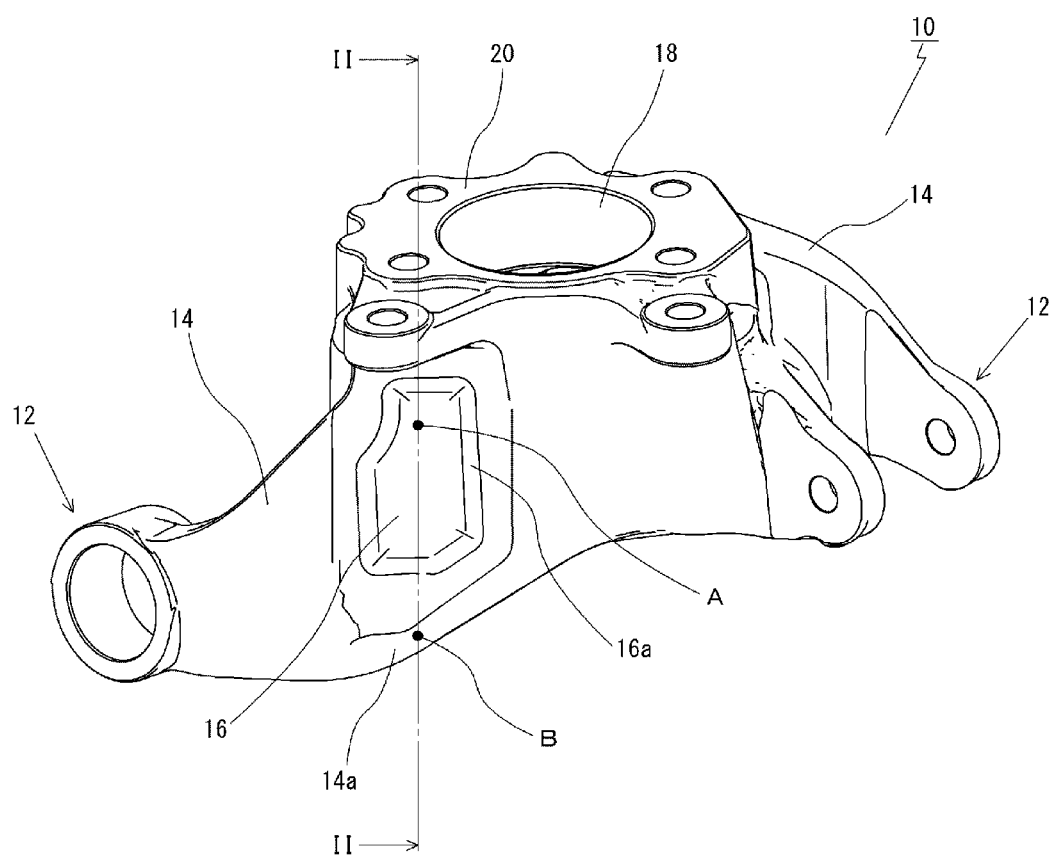
FIG. 1 is a perspective view of a steering knuckle.
Figure 2:
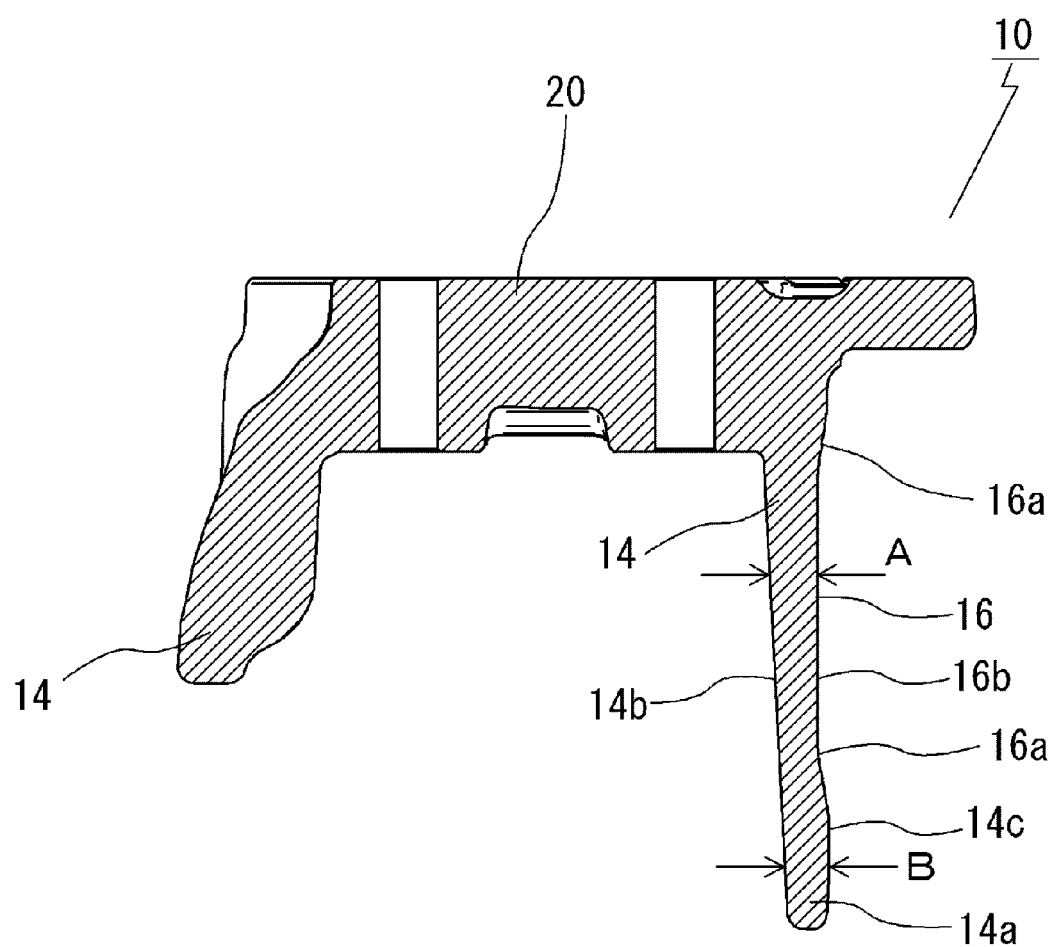
FIG. 2 is a cross sectional view taken along a line II-II of FIG. 1.

FIG. 1 is a perspective view of a steering knuckle 10 showing an example of a support structure for a vehicle, and FIG. 2 is a cross sectional view taken along a line II-II of FIG. 1.

The steering knuckle 10 according to the embodiment of the present invention, as described above, which is molded by a casting mold and is provided between a vehicle body and a vehicle component. And the steering knuckle 10 includes a support portion 12 for supporting the vehicle component and a rib 14 continuously formed on the support portion 12. The steering knuckle 10 comprises a core portion 16 recessed in a direction different from a mold split direction of the casting mold on the side surface of the rib 14.

The steering knuckle 10 which transmits the transmission force from the steering to the wheels, more specifically, has a complicated and irregular shape comprising a main body 20 including a cylindrical fitting hole 18 into which an axle (bearing) is fitted and fixed, and a support portion 12 connected to a periphery of the main body 20 via the rib 14 and connecting and supporting the vehicle component on a vehicle body side, such as an upper suspension, a lower suspension, and a steering arm.

Since the steering knuckle 10 has a complicated and irregular shape as described above, the steering knuckle 10 is cast using a casting mold having a mold split structure.

The steering knuckle 10 is preferably cast from aluminum or an alloy thereof. Alternatively, copper, magnesium, or an alloy thereof may be used. Alternatively, iron or an alloy thereof may be used.

The rib 14 is formed to have a draft angle as a whole, then the mold can be split. Then, in a portion having a draft angle, and therefore, having a wall thickness, the core portion 16 recessed in the direction different from the mold split direction of the casting mold is formed, so that the film is thin. As a result, the weight can be reduced while required strength is secured. That is, since there is no unnecessary portion on the side surface of the rib due to the restriction of the draft angle, the weight can be reduced.

It is preferable that the thickness A from the bottom surface 16b of the core portion 16 to the inner surface 14b of the rib 14 and the thickness B from the inner surface 14b to the outer surface 14c of the tip end portion 14a of the rib 14 are substantially equal. As a result, the required strength can be provided without applying unnecessary thickness to the entire rib 14.

Further, as shown in FIG. 1 and FIG. 2, it is preferable that the peripheral edge of the core portion 16 is formed into an inclined wall surface 16a expanding from the bottom surface to the outer surface 14c of the rib 14. As a result, it is possible to facilitate the removal of the punching mold for forming the core portion 16.

Further, as clearly shown in FIG. 2, it is preferable that the inclined wall surface 16a is formed into rounded surface smoothly continuous with the bottom surface 16b of the core portion 16 and the outer surface 14c of the rib 14. As a result, the core portion 16 can be made inconspicuous in appearance.

Figure 3:
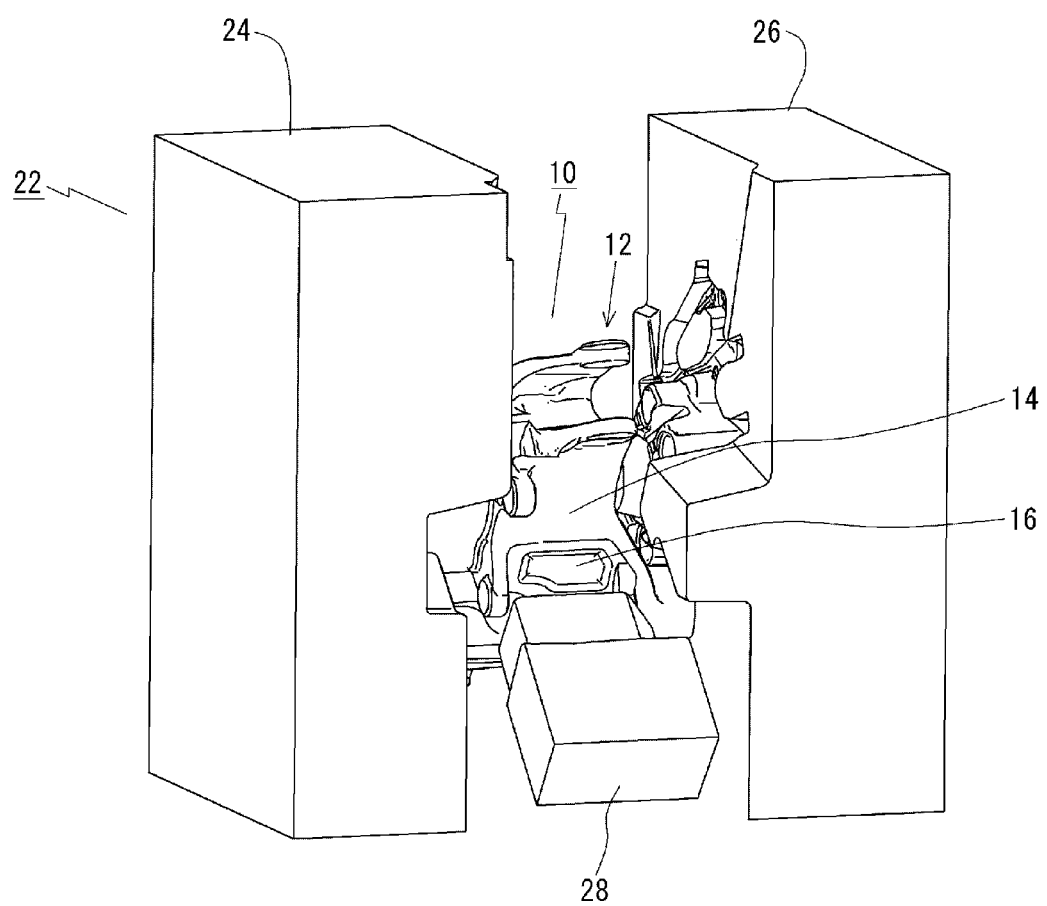
FIG. 3 is an explanatory view showing a state in which the steering knuckle is cast and split using a casting mold.

FIG. 3 is an explanatory view showing a state in which the steering knuckle 10 is cast and split using a casting mold 22.

The casting mold 22 includes a fixed mold 24, a movable mold 26, and a punching mold 28.

The movable mold 26 moves in the left-right direction in FIG. 3 with respect to the fixed mold 24 to open and close the mold.

The punching mold 28 is provided slidably in a direction different from the opening/closing direction of the movable mold 26, whereby the core portion 16 is recessed on the outer surface of the rib 14.

The drive mechanism of the movable mold 26 and the slide mechanism of the punching mold 28 can adopt a known mechanism.

That is, according to the method of manufacturing the steering knuckle 10 in the present embodiment, by using the casting mold 22 and punching with the punching mold 28 sliding in a direction different from the mold split direction of the casting mold 22, the core portion 16 recessed in a direction different from a mold split direction of the casting mold 22 is formed on the side surface portion of the rib 14. As a result, an unnecessary portion on the side surface of the rib 14 due to the restriction of the draft angle can be easily punched, and the weight can be reduced.

Although the steering knuckle 10 is described as an example of the support structure for the vehicle in the above embodiment, the support structure for the vehicle is not limited thereto, and the present invention can also be applied to, for example, an engine mount that supports an engine on a vehicle body.

What is claimed is:

1. A support structure for a vehicle molded by a casting mold, provided between a vehicle body and a vehicle component, and includes a support portion which supports the vehicle component and a rib continuously formed on the support portion,
    comprising: a core portion which is recessed in a surface portion of the rib and which extends into a wall of a main body on an opposing side of a fitting hole.

2. The support structure for a vehicle according to claim 1, wherein
    the core portion includes an inclined wall surface expanding from a bottom surface of the core portion to an outer surface of the rib.

3. The support structure for a vehicle according to claim 2, wherein
    the inclined wall surface is smoothly continuous with the bottom surface and the outer surface of the rib.

4. The support structure for a vehicle according to claim 1, wherein
    a thickness from a bottom surface of the core portion to an inner surface of the rib is equal to a thickness from the inner surface to an outer surface of a tip end portion of the rib.

5. The support structure for a vehicle according to claim 2, wherein
    a thickness from a bottom surface of the core portion to an inner surface of the rib is equal to a thickness from the inner surface to an outer surface of a tip end portion of the rib.

6. The support structure for a vehicle according to claim 3, wherein
    a thickness from a bottom surface of the core portion to an inner surface of the rib is equal to a thickness from the inner surface to an outer surface of a tip end portion of the rib.

7. A method of manufacturing the support structure for a vehicle provided between the vehicle body and the vehicle component and includes the support portion which supports the vehicle component and the rib continuously formed on the support portion of claim 1, comprising:
    casting the support structure by a casting mold,
    wherein the casting includes forming a core portion recessed in a direction different from a mold split direction on a side surface portion of the rib by punching with a punching mold that slides in a direction different from the mold split direction of the casting mold.

8. The support structure for a vehicle according to claim 1, wherein the main body extends from the rib and includes the fitting hole.

9. The support structure for a vehicle according to claim 8, wherein the core portion has an upper side that extends onto the main body.

10. The support structure for a vehicle according to claim 8, further comprising a support portion connected to a periphery of the main body via the rib.

* * * * *